April 30, 1935. O. C. ROHDE 1,999,785
METHOD OF UNITING PARTS
Filed Jan. 25, 1934
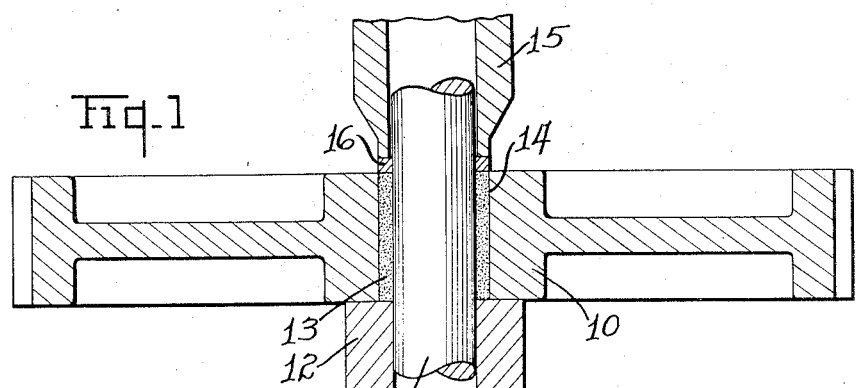
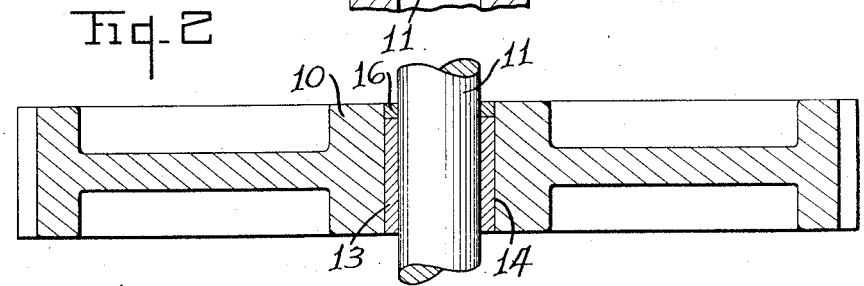
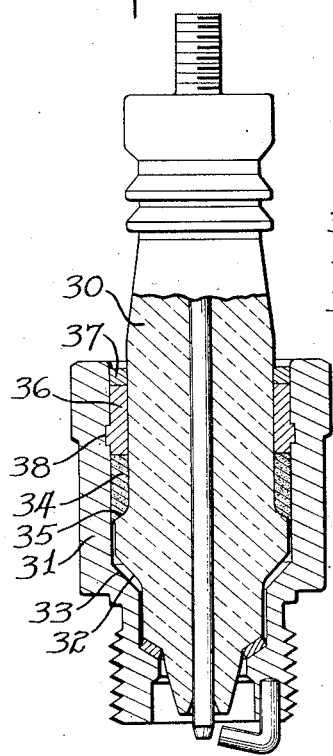
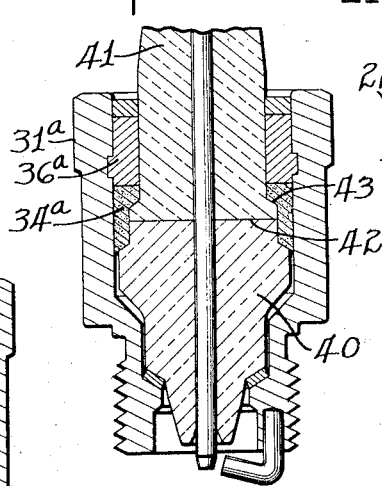
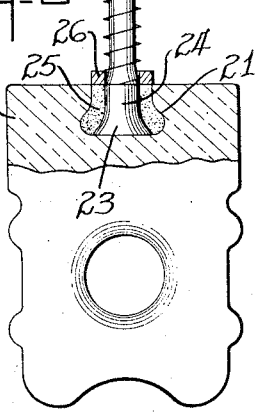
Inventor
Otto C. Rohde
By Owen & Owen
Attorneys Patented Apr. 30, 1935

1,999,785

UNITED STATES PATENT OFFICE 1,999,785

METHOD OF UNITING PARTS

Otto C. Rohde, Toledo, Ohio, assignor to Champion Spark Plug Company, Toledo, Ohio, a corporation of Delaware Application January 25, 1934, Serial No. 708,232

2 Claims. (Cl. 219—10)

This invention relates to a method of uniting parts, and more particularly to uniting parts by means of an electrical conducting material originally in granular form and heated by internal electric resistance to a plastic or liquid condition in situ between the parts to be united.

The object of the invention is to units parts in an economical and expeditious manner and so that a tight joint between the parts will be formed.

Specific examples of the method will be described in connection with the accompanying drawing, after which the general principles will be more fully stated.

Figure 1 is a section showing a shaft with a hub to be fastened thereon and in position for uniting in accordance with the invention; Fig. 2 shows the same elements after the uniting has been effected; Fig. 3 is a section illustrating the method as applied to mounting a metallic support in an insulator; Fig. 4 illustrates the method applied to the securing of a spark plug core in a surrounding shell; Fig. 5 illustrates the method applied to a spark plug having a different core.

In following the method as illustrated in Figs. 1 and 2, a wheel having a hub 10 is placed in the desired position on a shaft 11. An abutment block 12 is positioned against one side of the hub and around the shaft. Thereafter granular material 13 is inserted in the space 14 between the hub and shaft, preferably the granular material being first pressed into place so that it is compacted in space 14. Thereafter a suitable plunger 15 is applied to the material on the opposite side of the hub from abutment 12. In the form shown there is a ring 16 of good conducting material between plunger 15 and the granular material 13.

Electrical contact is made with the abutment and plunger and a current passed through these and the granular material in sufficient quantity to fuse that material. At the same time pressure is exerted upon the plunger so that the granular material is simultaneously melted and pressed into close contact with the interior wall of the hub and the exterior of the shaft. As soon as sufficient melting has been effected, the current is discontinued and the molten material is allowed to cool and solidify, thereby forming a permanent union between the hub and shaft. Ordinarily this will form a sufficiently tight frictional connection between the parts so that the pulley, wheel, collar, cam or other part is held permanently in the desired position upon the shaft. In cases where the parts are subjected to greater strain, the hub or shaft or both may be roughened, flattened, undercut or formed with keyways, as desired, so as to furnish whatever resistance to relative motion is necessary under the particular circumstances; but one advantage of the method is that, for many purposes, a sufficient union is effected merely by the method described and with a cylindrical hole through the hub concentric with the surface of the shaft.

The film of grease or oxide ordinarily present on the hub and shaft is sufficient to direct the melting current through granular material which has no more electrical resistance than necessary for melting it, but where necessary additional blackening or other treatment may be given the hub and shaft to insure the flow of current through the granular material.

In some instances the electrical resistance of the hub or shaft may be less than that of the granular material but greater than that of the solid material of which the granules are composed. In such cases the current may pass through and melt only the end or ends of the granular mass until that is melted, and the melting may proceed progressively. But in the preferred method the current is sufficient so that the melting is almost instantaneous, and the melting, compressing, and solidifying are very quickly effected.

The use of a ring 16 is shown but is not always necessary. In many instances it is a convenience in that the ring may be made of good conducting material which will evenly distribute the electric current, and it may be left in place so that any adherence of the molten material will take place on the surface of this ring which is left in position rather than in contact with the plunger which is removed and employed for repeated operations. With some materials there is a tendency for the molten matter to adhere to the plunger to an objectionable extent, and this difficulty is avoided by ring 16 or its equivalent.

In Fig. 3 there is shown the application of the method to positioning a metallic holder 20 in place within a socket 21 of an insulator 22. In this case it is preferable to have the head 23 of the metallic holder brightened so that it will make a better contact than will the surface of the holder 24 above the head. In some instances it may be desirable to deliberately blacken or oxidize or otherwise to increase the electric resistance at the surface of the holder above the head. The holder is placed in position, as shown in Fig. 3, and the socket pressed full of granular material 25. A following ring 26 may be employed similar to ring 16 discussed above, and electric connection made by a plunger with this ring. The other electric contact may be made with the outer end 26 of the holding member. Thereafter the material is melted by an electric current, pressed into the socket, and solidified therein, as described above in connection with Figs. 1 and 2.

Fig. 4 illustrates a slight modification of the method as applied to fastening a spark plug core in a surrounding shell. In accordance with this illustration, a core 30 of any suitable shape is mounted within a shell 31. In the device shown, the shoulder 32 of the core faces the shoulder 33 of the shell. These shoulders make fairly close contact but may not be entirely liquid tight. It has been found that when molten metal is pressed against the joint between the shoulders there is sometimes a somewhat irregular edge on the molten metal. To avoid this possibility, soapstone powder 34 is first compacted into the bottom of the pocket 35 within the shell and around the core. Any other suitable material may be employed for forming a tight joint. Of course material should be used that will withstand the heat resulting from melting granular material in contact therewith. Thereafter granular material 36, which may be powdered aluminum, is pressed into the uniting pocket above the soapstone. Then a ring 37 is placed upon the powdered aluminum. Ring 37 may be of copper. Thereafter a plunger is employed to press the copper ring downward while an electric current is passed from the copper ring through the powdered aluminum and shell until the internal resistance of the aluminum powder results in melting the same. The pressure thereupon forces the molten aluminum into intimate contact with the outside of the core and the inside of the shell, and it is allowed to set and cool in that contact. In the example shown there is a slight groove 38 in the wall of the shell furnishing additional means, besides friction, for holding the aluminum in place within the shell.

In Fig. 5 there is shown a construction in which a two piece core is held within a spark plug shell by metal cast in holding position. In this case, the shell 31a is the same as shown in Fig. 4, but the core consists of two pieces 40 and 41. Lower piece 40 is similar to the lower end of core 30, up to the transverse plane of cleavage 42. Upper piece 41 is similar to the upper end of core 30, but has a shoulder 43 above the plane of cleavage. Soapstone powder or the like 34a is compressed around the plane of cleavage and preferably against shoulder 43. Thereafter an aluminum holding element 36a is cast in place in the same way as the corresponding holding element shown in Fig. 4.

Other suitable sealing material may be used in place of soapstone powder, but the material mentioned is excellent, as it yields sufficiently to avoid breaking strain up the core. In the example shown in Fig. 5, soapstone is advantageous because it forms insulation around the plane of cleavage 42, where otherwise there might be leakage from the central electrode to the shell. In this form, material substituted for the soapstone should have insulating quality. This is not so essential in the form shown in Fig. 4.

In the foregoing description it has been indicated that aluminum powder is suitable for use in securing a spark plug core within its surrounding steel shell. This results in a holding ring of aluminum which is sufficiently soft to avoid cracking or breaking the procelain core or the like in contact with which it is solidified, and at the same time holds the core very firmly in position and maintains a gas-tight joint therewith.

It will be readily understood that other materials may be used if they have the proper quality after melting and have a range of electrical resistance such that available currents may be readily employed in melting them and may be passed therethrough without troublesome precautions against the current following the shell instead of passing through the material. Various metallic powders may be used under varying circumstances in accordance with the desired hardness, strength, etc. of the final uniting material and also in accordance with the degree of electrical resistance which is desirable under the circumstances and the melting temperature which is permissible under working conditions. Selection of different kinds of metallic powder and particularly different mixtures of metallic powders, with selection of grain sizes as desired, allows for an almost endless variety of granular material which can be employed to suit the particular conditions under which it is to be used.

While the granular material referred to is primarily particles of conducting metal, it need not be exclusively so. It is possible to obtain a sealing effect by this method with non-conducting particles mixed with the conducting particles, but the granular mass as a whole must be sufficiently conducting to allow of its melting by a current passed therethrough, in order to come within this method. It will be readily apparent that relatively large particles of ceramic or other non-conducting material may be dusted with smaller particles of metal so that, when compressed in a uniting pocket, the powdered metal will be sufficiently continuous to conduct a melting current, and the mass may be compacted and united by melting the metal. This allows of further control of the exact degree of conductivity of the granular material and also of the qualities of the final uniting element as to strength, hardness, co-efficient of heat expansion and the like.

It will be understood that "granular material", as used in the claims, is intended to cover material consisting of any desired sizes of particles, from fine powder up.

There have been disclosed three quite widely differing circumstances under which the method may be employed for uniting parts. It will be readily understood that many other different parts may be united by the same method where they can be held together by material melted and consolidated in place in a pocket between the parts.

What is claimed is:—

1. The method of uniting parts which consists in assembling the parts with a uniting pocket therebetween, introducing granular conducting material into the pocket, pressing upon the surface of the granular material a follower having less electrical resistance than the granular material, passing an electric current through the follower and granular material and melting said material while the follower remains solid, pressing the follower down upon the molten material, solidifying the material in close contact with the walls of the pocket, and leaving the follower in position as a finish at the entrance of the pocket.

2. The method of uniting parts, which consists in assembling the parts with a uniting pocket therebetween, introducing granular conducting material into the pocket, applying to the powder at the mouth of the pocket a follower which is a conductor of electricity, passing an electric current through the follower, the conducting material, and one of said parts, and melting said material within the pocket, pressing the follower upon the material within the pocket and solidifying the material in close contact with the walls of the pocket.

OTTO C. ROHDE.